United States Patent
Ashby, Jr. et al.

(10) Patent No.: US 10,142,179 B2
(45) Date of Patent: Nov. 27, 2018

(54) SELECTING RESOURCES FOR AUTOMATIC MODELING USING FORECAST THRESHOLDS

(71) Applicants: John Wiley Ashby, Jr., Austin, TX (US); Balaji Varadaraju, Austin, TX (US)

(72) Inventors: John Wiley Ashby, Jr., Austin, TX (US); Balaji Varadaraju, Austin, TX (US)

(73) Assignee: CA, Inc., New York, NY (US)

( * ) Notice: Subject to any disclaimer, the term of this patent is extended or adjusted under 35 U.S.C. 154(b) by 358 days.

(21) Appl. No.: 14/645,647

(22) Filed: Mar. 12, 2015

(65) Prior Publication Data
US 2016/0269239 A1    Sep. 15, 2016

(51) Int. Cl.
*H04L 12/24* (2006.01)
*H04L 12/26* (2006.01)

(52) U.S. Cl.
CPC ........ *H04L 41/0823* (2013.01); *H04L 41/145* (2013.01); *H04L 41/22* (2013.01); *H04L 43/0817* (2013.01)

(58) Field of Classification Search
None
See application file for complete search history.

(56) References Cited

U.S. PATENT DOCUMENTS

| | | | | |
|---|---|---|---|---|
| 8,041,808 B1* | 10/2011 | Becker | ................ | G06F 11/3442 702/179 |
| 2001/0016821 A1* | 8/2001 | DeBusk | .................. | G06F 17/30 705/2 |
| 2008/0052719 A1* | 2/2008 | Briscoe | ............... | H04L 41/0806 718/104 |
| 2008/0270526 A1* | 10/2008 | Barnett | ................... | H04L 67/10 709/203 |
| 2010/0153157 A1* | 6/2010 | Wade | ................. | G06Q 10/0631 705/7.12 |
| 2015/0081880 A1* | 3/2015 | Eaton | .................... | H04L 47/785 709/224 |
| 2016/0034835 A1* | 2/2016 | Levi | ........................ | H04L 67/10 705/7.23 |
| 2016/0112245 A1* | 4/2016 | Mankovskii | .......... | H04L 41/069 709/204 |

\* cited by examiner

*Primary Examiner* — Umar Cheema
*Assistant Examiner* — John Fan
(74) *Attorney, Agent, or Firm* — Baker Botts L.L.P.

(57) ABSTRACT

A method includes retrieving capacity utilization data for a plurality of resources and applying a linear regression analysis on the capacity utilization data. The method further includes projecting, using a processor, the capacity utilization data through a future time based on results of the linear regression analysis. The method additionally includes determining a deviation from a predetermined threshold range in the projected capacity utilization data for a first resource, and, in response to determining the deviation, determining, for each of a plurality of resource configurations, future capacity utilization of the first resource based on a non-linear capacity consumption model corresponding to the resource configuration. The method also includes applying a selected resource configuration from the plurality of resource configurations to the first resource to prevent the first resource from deviating from the predetermined threshold range.

20 Claims, 16 Drawing Sheets

AUTOMATED CAPACITY MODEL OPPORTUNITIES/EXAMPLES

- RESOURCE SCORING
  - PROJECTIONS/RESULTS ARE LINEAR SO SIMULATIONS ARE NOT BOUND TO A SPECIFIC TOOL.

| SCENARIO | CURRENT STATE | +10% | +15% | +20% | +25% | +30% | +35% | +40% | +45% | +50% | +55% | +60% | +65% | +70% | +75% | +80% | +85% | +90% | +95% | +100% |
|---|---|---|---|---|---|---|---|---|---|---|---|---|---|---|---|---|---|---|---|---|
| LINEAR CPU PROJECTION | 43.63 | 47.99 | 50.17 | 52.36 | 54.54 | 56.72 | 58.9 | 61.08 | 63.26 | 65.45 | 67.63 | 69.81 | 71.99 | 74.17 | 76.35 | 78.53 | 80.72 | 82.9 | 85.08 | 87.26 |
| CA CAPACITY MODEL PROJECTION | 55.7 | 60.57 | 63.33 | 66.08 | 68.83 | 71.59 | 74.34 | 77.09 | 79.85 | 82.6 | 85.35 | 88.11 | 90.86 | 93.61 | 96.37 | 89.12 | | | | |

- CURRENT STATE (CAPACITY) – 55.7%

- 55.07 X 1.50 = 82.605%

- 55.07 X 1.75 = 96.3725%

CPU CAPACITY = RESCORE VALUE

FIG. 5

AUTOMATED MODELING FEATURES

| SERVICE PROFILE SUMMARY - MONTHLY | | | | | 2014-10-08 17:38 - 2014-11-07 17:38 UTC | | |
|---|---|---|---|---|---|---|---|
| SERVICE | TOTAL SERVERS | HEADROOM RISK | TRENDING RISK | WASTED RESOURCES | | | |
| BANKING | 25 | 0 | 0 | 34 | SERVICE PROFILE | SERVICE OPTIMIZATION | SERVICE FORECAST |
| CORPORATE | 72 | 9 | 15 | 93 | SERVICE PROFILE | SERVICE OPTIMIZATION | SERVICE FORECAST |
| ENERTAINMENT | 4 | 0 | 0 | 6 | SERVICE PROFILE | SERVICE OPTIMIZATION | SERVICE FORECAST |
| FORWARDINC.COM | 23 | 2 | 6 | 9 | SERVICE PROFILE | SERVICE OPTIMIZATION | SERVICE FORECAST |
| INSURANCE | 26 | 1 | 1 | 38 | SERVICE PROFILE | SERVICE OPTIMIZATION | SERVICE FORECAST |
| MANAGED SERVICES | 24 | 5 | 7 | 7 | SERVICE PROFILE | SERVICE OPTIMIZATION | SERVICE FORECAST |
| ONLINE TRADING | 19 | 5 | 7 | 4 | SERVICE PROFILE | SERVICE OPTIMIZATION | SERVICE FORECAST |
| RETAIL | 48 | 4 | 8 | 59 | SERVICE PROFILE | SERVICE OPTIMIZATION | SERVICE FORECAST |
| SAP | 24 | 5 | 13 | 23 | SERVICE PROFILE | SERVICE OPTIMIZATION | SERVICE FORECAST |
| | 1 OF 1 | | | | | MAX PER PAGE | 10 ▾ |

FIG. 9

☑ VM SIZING REPORT - CORPORATE

| VM | OS | vCPU CONFIG. | vCPUs RESIZE | CPU UTIL | vRAM CONFIG. | vRAM RESIZE | MEM UTIL | STORAGE CONFIG. | STORAGE UTIL |
|---|---|---|---|---|---|---|---|---|---|
| INTEROP-IDENTITY MANAGER SERVER | WINNETENTERPRISEGUEST | 1 | 2▲ | 100% | 2 | 1▼ | 29% | 67GB | 64% |
| sl57_arcserve-production_dod3-sl57 | WINDOWS7SERVER64GUEST | 2 | 4▲ | 99% | 8 | 4▼ | 29% | 213GB | 88% |
| s83_arcserve-production_dod10-s83 | WINDOWS7SERVER64GUEST | 2 | 4▲ | 88% | 4 | 4▼ | 54% | 213GB | 47% |
| s34_arcserve-production_dod8-s34 | WINDOWS7SERVER64GUEST | 2 | 4▲ | 76% | 4 | 3▼ | 49% | GB | % |
| s254_nimsoftdod7.6.1_dod12-s254 | WINDOWS7SERVER64GUEST | 1 | 2▲ | 71% | 8 | 8 | 62% | 156GB | 38% |
| usilsc97_244.186 | WINDOWS7SERVER64GUEST | 2 | 2▲ | 43% | 8 | 4▼ | 31% | GB | % |
| s99_dipex10 | WINDOWS7SERVER64GUEST | 1 | 1 | 34% | 4 | 2▼ | 34% | 122GB | 52% |
| usilsc96_244.146 | WINDOWS7SERVER64GUEST | 2 | 1▼ | 26% | 8 | 6▼ | 48% | 113GB | 82% |
| s09-vcenter | WINDOWS7SERVER64GUEST | 2 | 1▼ | 17% | 4 | 2▼ | 32% | 94GB | 54% |
| s09-mssql | WINDOWS7SERVER64GUEST | 2 | 1▼ | 11% | 4 | 2▼ | 21% | 94GB | 50% |

| VM CPU-MEM PROJECTION-CORPORATE 20% | | | | |
|---|---|---|---|---|
| PROJECTION INTERVAL | CURRENT STATE CPU/MEM | RESOURCE BREACH CPU/MEM | CPU PROJECTIONS | MEMORY PROJECTIONS |
| usilstun40 | ▨▨ | -/6 | ▨▨▨▨▨▨▨▨▨▨▨▨▨▨▨▨▨▨▨▨▨▨▨▨▨▨▨▨ | ▨▨▨▨▨▨▨▨▨▨▨▨▨▨▨▨▨▨▨▨▨▨▨▨▨▨▨▨ |
| dod-na-vstn-pl7 | ▨▨ | -/18 | ▨▨▨▨▨▨▨▨▨▨▨▨▨▨▨▨▨▨▨▨▨▨▨▨▨▨▨▨ | ▨▨▨▨▨▨▨▨▨▨▨▨▨▨▨▨▨▨▨▨▨▨▨▨▨▨▨▨ |
| reno120-siteminderpolicy | ▨▨ | -/17 | ▨▨▨▨▨▨▨▨▨▨▨▨▨▨▨▨▨▨▨▨▨▨▨▨▨▨▨▨ | ▨▨▨▨▨▨▨▨▨▨▨▨▨▨▨▨▨▨▨▨▨▨▨▨▨▨▨▨ |
| pl4-open_acesswin7client2 | ▨▨ | -/17 | ▨▨▨▨▨▨▨▨▨▨▨▨▨▨▨▨▨▨▨▨▨▨▨▨▨▨▨▨ | ▨▨▨▨▨▨▨▨▨▨▨▨▨▨▨▨▨▨▨▨▨▨▨▨▨▨▨▨ |
| s01_usildodpam3 | ▨▨ | -/- | ▨▨▨▨▨▨▨▨▨▨▨▨▨▨▨▨▨▨▨▨▨▨▨▨▨▨▨▨ | ▨▨▨▨▨▨▨▨▨▨▨▨▨▨▨▨▨▨▨▨▨▨▨▨▨▨▨▨ |
| dod-na-aim-p04 | ▨▨ | -/- | ▨▨▨▨▨▨▨▨▨▨▨▨▨▨▨▨▨▨▨▨▨▨▨▨▨▨▨▨ | ▨▨▨▨▨▨▨▨▨▨▨▨▨▨▨▨▨▨▨▨▨▨▨▨▨▨▨▨ |
| dod-na-vstn-p05 | ▨▨ | -/- | ▨▨▨▨▨▨▨▨▨▨▨▨▨▨▨▨▨▨▨▨▨▨▨▨▨▨▨▨ | ▨▨▨▨▨▨▨▨▨▨▨▨▨▨▨▨▨▨▨▨▨▨▨▨▨▨▨▨ |
| dod-na-xrx-d03 | ▨▨ | -/- | ▨▨▨▨▨▨▨▨▨▨▨▨▨▨▨▨▨▨▨▨▨▨▨▨▨▨▨▨ | ▨▨▨▨▨▨▨▨▨▨▨▨▨▨▨▨▨▨▨▨▨▨▨▨▨▨▨▨ |
| pfsense-vpc_gateway | ▨▨ | -/- | ▨▨▨▨▨▨▨▨▨▨▨▨▨▨▨▨▨▨▨▨▨▨▨▨▨▨▨▨ | ▨▨▨▨▨▨▨▨▨▨▨▨▨▨▨▨▨▨▨▨▨▨▨▨▨▨▨▨ |
| dod-na-vstn-pl3 | ▨▨ | -/- | ▨▨▨▨▨▨▨▨▨▨▨▨▨▨▨▨▨▨▨▨▨▨▨▨▨▨▨▨ | ▨▨▨▨▨▨▨▨▨▨▨▨▨▨▨▨▨▨▨▨▨▨▨▨▨▨▨▨ |

FIG. 12A

VM CPU PROJECTION REPORT-CORPORATE

| PROJECTION INTERVAL | CURRENT STATE | INTERVAL BREACH | 1 | 2 | 3 | 4 | 5 | 6 | 7 | 8 |
|---|---|---|---|---|---|---|---|---|---|---|
| interop-identity manager server | 108% | 0 | 130% | 156% | 187% | 224% | 269% | 322% | 387% | 464% |
| s09-esx-storage | 4% | 17 | 5% | 6% | 7% | 8% | 10% | 12% | 14% | 17% |
| s99_dlpcms01 | 4% | 16 | 5% | 6% | 8% | 9% | 11% | 13% | 16% | 19% |
| s99_dlpex10 | 62% | 2 | 74% | 89% | 107% | 128% | 154% | 184% | 221% | 265% |
| s99_dlppe01 | 3% | 18 | 4% | 5% | 6% | 7% | 8% | 10% | 12% | 14% |
| coe-vaim | 8% | 13 | 10% | 12% | 15% | 18% | 21% | 25% | 30% | 36% |
| reno120 – siteminderpolicy | 1% | - | 1% | 2% | 2% | 3% | 3% | 4% | 4% | 5% |
| dod-na-clkv-p02 | 17% | 9 | 20% | 24% | 29% | 35% | 42% | 50% | 60% | 73% |
| dod-na-vstn-p14 | 1% | - | 1% | 2% | 2% | 2% | 3% | 4% | 4% | 5% |
| dod-na-vstn-p15 | 2% | - | 2% | 2% | 3% | 3% | 4% | 5% | 6% | 7% |

VM MEM PROJECTION REPORT-CORPORATE

| PROJECTION INTERVAL | CURRENT STATE | INTERVAL BREACH | 1 | 2 | 3 | 4 | 5 | 6 | 7 | 8 |
|---|---|---|---|---|---|---|---|---|---|---|
| interop-identity manager server | 28% | 10 | 30% | 33% | 36% | 40% | 45% | 50% | 57% | 65% |
| s09-esx-storage | 1% | - | 2% | 2% | 2% | 2% | 2% | 3% | 3% | 3% |
| s99_dlpcms01 | 4% | - | 5% | 5% | 6% | 6% | 7% | 8% | 9% | 10% |
| s99_dlpex10 | 38% | 8 | 41% | 44% | 49% | 54% | 60% | 68% | 77% | 87% |
| s99_dlppe01 | 3% | - | 3% | 3% | 4% | 4% | 5% | 5% | 6% | 7% |
| coe-vaim | 18% | 13 | 19% | 21% | 23% | 25% | 28% | 32% | 36% | 41% |
| reno120 - siteminderpolicy | 9% | 17 | 10% | 10% | 12% | 13% | 14% | 16% | 18% | 21% |
| dod-na-clkv-p02 | 4% | - | 4% | 4% | 5% | 5% | 6% | 6% | 7% | 8% |
| dod-na-vstn-p14 | 2% | - | 2% | 2% | 2% | 2% | 2% | 3% | 3% | 4% |
| dod-na-vstn-p15 | 1% | - | 2% | 2% | 2% | 2% | 2% | 3% | 3% | 3% |

VM CPU-MEM PROJECTION-CORPORATE 20%

| PROJECTION INTERVAL | CURRENT STATE CPU/MEM | RESOURCE BREACH CPU/MEM ▽ | CPU PROJECTIONS |
|---|---|---|---|
| coe-apm | | 9/8 | |
| dod-na-nsft-p01 | | 9/6 | |
| dod-na-cptymgr-p01-vpm | | 9/12 | |
| sl57_arcserve-production_dod3-sl57 | | 9/11 | |
| dod-na-pam-p02 | | 9/11 | |
| s09-vcenter | | 9/10 | |
| s01_dod-na-mdb-p01 | | 9/- | |
| dod-na-vlkv-p02 | | 9/- | |
| tixchange-db | | 8/17 | |
| usilsc18b | | 8/16 | |
| usildodpam3 | | 8/11 | |
| usilsc96_244.146 | | 6/5 | |
| dod-na-xrx-d01 | | 6/12 | |
| dod-na-xrx-d02 | | 6/10 | |
| usilsc97_244.186 | | 5/4 | |
| dod-na-pam-d01 | | 5/11 | |
| tixchange-appl | | 4/15 | |
| s01_dod-na-pam-p02 | | 3/11 | |
| s99_dlpex10 | | 2/8 | |
| s01_dod-na-sc-p01 | | 2/16 | |
| coe-home | | 18/18 | |
| s99_dlpwin7 | | 18/18 | |
| coe-eisa | | 18/18 | |

FIG. 12D

SELECTING RESOURCES FOR AUTOMATIC MODELING USING FORECAST THRESHOLDS

BACKGROUND

The disclosure relates generally to resource models, and more specifically to selecting resources for automatic modeling using forecast thresholds.

SUMMARY

According to one embodiment of the disclosure, a method includes retrieving capacity utilization data for a plurality of resources and applying a linear regression analysis on the capacity utilization data. The method further includes projecting, using a processor, the capacity utilization data through a future time based on results of the linear regression analysis. The method additionally includes determining a deviation from a predetermined threshold range in the projected capacity utilization data for a first resource, and, in response to determining the deviation, determining, for each of a plurality of resource configurations, future capacity utilization of the first resource based on a non-linear capacity consumption model corresponding to the resource configuration. The method also includes applying a selected resource configuration from the plurality of resource configurations to the first resource to prevent the first resource from deviating from the predetermined threshold range.

Other features and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the features and advantages thereof, reference now is made to the following description taken in connection with the accompanying drawings.

FIG. 5 illustrates differences between projections of linear CPU utilization and projections of capacity consumption based on a non-linear capacity consumption model or scalability model in accordance with a non-limiting embodiment of the present disclosure.

FIG. 9 illustrates an example user interface for displaying results of a forecast threshold analysis by service in a system for selecting resources for automatic modeling using forecast thresholds in accordance with a non-limiting embodiment of the present disclosure.

FIG. 10B illustrates an example user interface for displaying a virtual machine sizing report in a system for selecting resources for automatic modeling using forecast thresholds in accordance with a non-limiting embodiment of the present disclosure.

FIG. 12A illustrates CPU and memory projection reports for various virtual machines in accordance with a particular non-limiting embodiment of the present disclosure.

FIG. 12B illustrates CPU and memory projection reports for various virtual machines in accordance with a particular non-limiting embodiment of the present disclosure.

FIG. 12C illustrates CPU and memory projection reports for various virtual machines in accordance with a particular non-limiting embodiment of the present disclosure.

FIG. 12D illustrates CPU and memory projection reports for various virtual machines in accordance with a particular non-limiting embodiment of the present disclosure.

DETAILED DESCRIPTION

Figure 1:
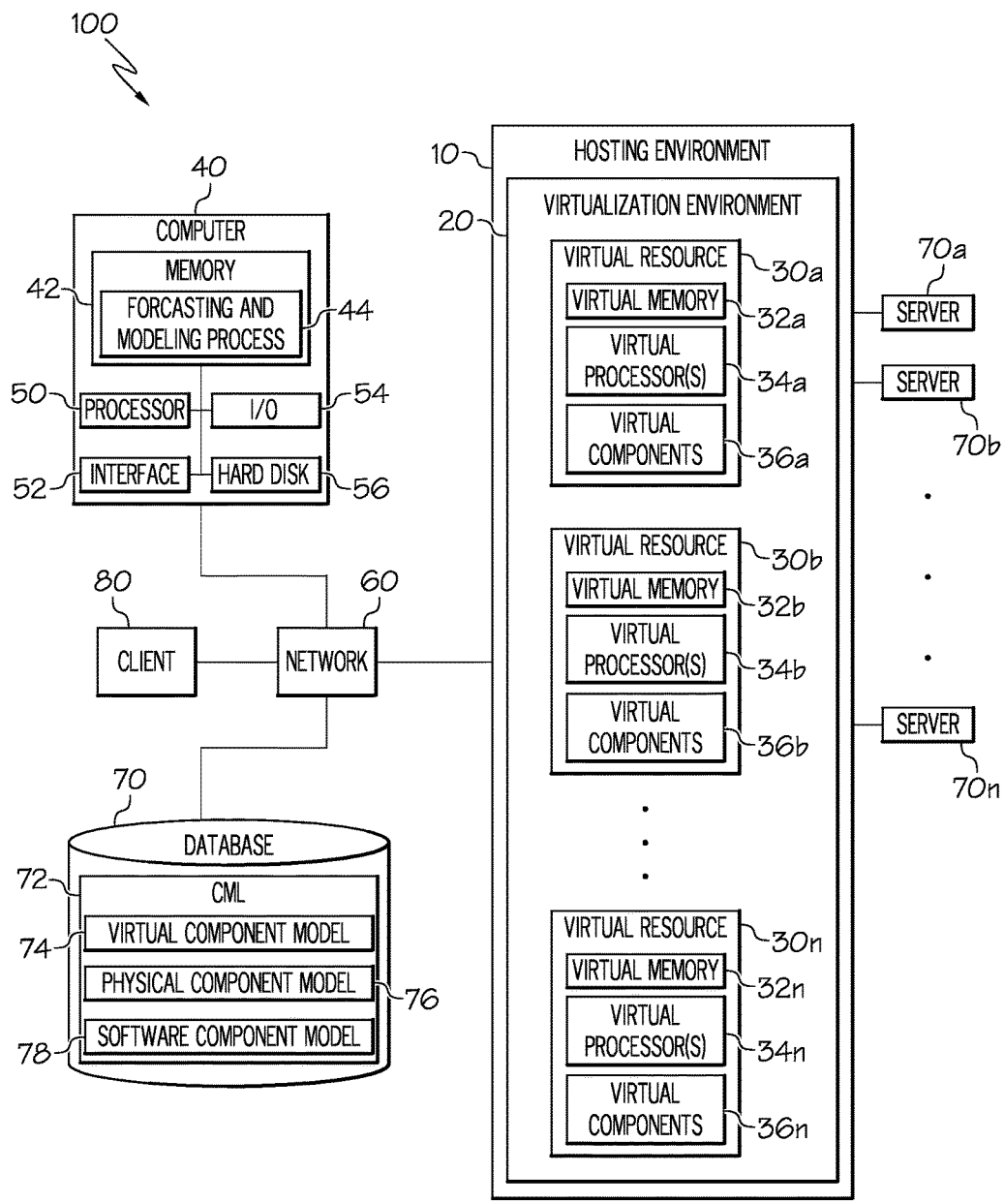
FIG. 1 illustrates a block diagram of a system for selecting resources for automatic modeling using forecast thresholds in accordance with a non-limiting embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Capacity management systems assist IT administrators in understanding capacity needs, optimizing asset utilization and cutting costs across large scale IT environments. Capacity management systems also help maintain higher service levels across high-volume physical, virtual and cloud environments while helping to reduce capital expenditures and operating expenditures associated with hardware, software, power, and cooling. In addition, these systems may help manage information technology changes with tools that predict the impact of workload increases, architectural changes or new application deployments.

Some capacity management systems include capacity modeling capabilities, wherein resource utilization and capacity are projected for a particular IT infrastructure. Capacity management systems may also include resource management functionality that assists administrators by interpreting capacity modeling results into actionable analysis. The results of the analysis aids in optimizing workload placement and right-sizing of resources.

Virtual resource management software may utilize capacity modeling processes to, for example, analyze workload placement and right-sizing of virtual resources, tailor virtual resource provisioning to an organization's needs, and optimize resource capacity and performance. Models may be generated using a library of virtual and/or physical computing components (i.e., the component model library, or "CML"). The CML may include models for a variety of platforms, resources, virtualization products, operating systems, processor architectures, and/or memory configurations. Models from the CML may be used to model performance of a virtualization environment by selecting models that correspond to each virtual resource in the environment.

Resource scores may be generated for each virtual resource based on the selected CML models and current utilization metrics. Resource scores are a normalized, platform independent metric for identifying under/over-utilized virtual resources for consolidation and/or redeployment.

However, current capacity modeling implementations may require a series of manual operations in order to effectively model virtual resource configuration capacity consumption and head-room. The number of manual steps currently required may be prohibitive for a large organization with vast IT infrastructure resources. For example, one such capacity modeling process requires the following steps:

First, the data center is configured for the model, which requires collection of data from a data manager, configuration of data center assets, and configuration and/or calibration of workloads. Each of these actions may require manual user operation and configuration.

Next, the capacity modeling process additionally requires creation of a model. This requires selection of components and/or servers, determination of baseline statistics and metrics and/or workload mapping and association functions. Each of these steps may require manual user operation and configuration.

Additionally, the capacity modeling process may further require model scenario output publishing. This may require scenario creation, scenario refinement, and/or publishing of end results. Each of these steps may require manual user operation and configuration.

Each of these steps may take a considerable amount of time and effort. Thus, IT administrators that are responsible for a vast number of physical and/or virtual resources, such as a system administrator for a virtual environment, data center, server farm, or the like, may only be able to model a limited number of systems. For example, certain organizations maintain thousands of virtual systems. Administrators of such systems may lack sufficient resources to undertake the complex configuration steps required for modeling each system that the organization maintains. Accordingly, system administrators may desire a system that automates capacity modeling for a larger number of systems.

For example, certain organizations may have over 1,000 host servers, over 10,000 virtual machines, and/or over 100 clusters. IT administrators may lack the resources required for scheduling, configuring, analyzing, reacting, or responding to capacity performance, capacity consumption, and other performance metrics for each of these resources. Administrators may only have the capabilities or resources to administer, review, and evaluate several capacity consumption models for various growth or configuration scenarios. However, determining which resources to model may be problematic for the administrator when he or she is faced with such a large number of resources servicing a large number of critical applications.

Organizations additionally may have significant budgetary constraints. Thus, capacity and consumption scenario modeling analysis for server, virtual resource, service, or application consolidation may be extremely important. For example, application infrastructure modeling may show which applications are most in need of expansion and which resources can be consolidated. Consolidation may free up additional resources, and thus provide the organization with much needed budget room. For example, in a cloud environment, organizations can request new resources on-demand and pay for only those resources they use. Thus, elimination of a particular resource due to a resource consolidation effort may save the organization economic resources. Further, consolidation may free up resources for use with other applications and services. For example, in a private cloud environment, the physical infrastructure and computing power may be used to service other applications. Such consolidation and re-assignment configurations can be planned for as well.

With no guidance as to which resources to model, administrators may be inclined to model resources servicing only particular applications or hosting certain services. For example, administrators may configure models only for those applications perceived to be the most critical, such as client-facing applications, because of these time and resource considerations. However those resources may not be in need of reconfiguration or consolidation. Thus, administrators may be left unprepared when other applications experience resource consumption related problems, such as crashing, processing delays, and the like. For example, internal applications necessary for employees to perform work-related functions may not be modeled for optimization. Thus, while certain critical client-facing applications may be modeled, internal-facing applications (i.e., productivity software, services, and other internal applications), representing a significant portion of an organization's IT budget, may not be modeled for optimization. Further, resources that are critical for execution of employee's job responsibilities may become unavailable, thus making those employees less efficient. Alternatively, resources that are good candidates for consolidation may never be uncovered, thus wasting valuable organization resources that could be more efficiently utilized by servicing other applications.

Thus, certain IT administrators may prefer a system that automatically selects infrastructure resources for modeling based on analysis of projected capacity and consumption metrics. The teachings of the present disclosure present a system that uses forecast thresholds to determine which resources to model. Thus, IT administrators are presented with a list of those resources that are most in need of modeling. The models include various scenarios that may assist the administrator in selection of a reconfiguration or consolidation plan for services or applications.

For example, the system may use a linear regression analysis on capacity headroom and consumption metrics for a set of servers, virtual resources, components, services, processes, or the like. The linear regression analysis may produce an output, such as a trend line. The trend line may be projected into the future to determine trended capacity headroom and consumption metrics. The trended metrics are compared against baseline metrics. The trended metrics may additionally be compared against predetermined threshold ranges. The threshold ranges may include a minimum and maximum headroom or capacity consumption level.

In certain embodiments, the system may project the headroom and consumption data and determine resources whose metrics diverge from the predetermined threshold ranges. For example, if one server's trended capacity headroom metric for CPU consumption is projected to exceed the maximum threshold range in 2 months, that server is marked as a good candidate for modeling. As another example, if a particular virtual resource has projected capacity headroom for memory consumption that falls below a minimum threshold range in 3 months, that virtual resource may also be scheduled for scenario modeling.

The modeling scenarios may vary based on the threshold ranges that each resource falls below. For example, if a virtual resource is projected to fall below a certain predetermined threshold range within 3 weeks, the system may generate several scenarios useful for modeling that virtual resource with respect to a virtual resource consolidation operation. The system may find additional virtual resources that are also underutilized or projected to be underutilized and may generate models associated with the consolidation of the underutilized resources. In another example, if a virtual resource's CPU component utilization is projected to rise above a certain threshold range, the system may generate scenarios useful for modeling a reassignment of workloads or a reconfiguration, including addition of CPU components, of the resource.

In certain embodiments, resources associated with a particular application may be modeled. For example, the system may, based on projected capacity headroom and utilization data for one particular resource that diverges from a predetermined threshold, find associated resources for modeling and generate scenarios for modeling. Scenarios may include various configuration changes, workload modifications, consolidations, and/or expansions of resources assigned to execution of the particular application.

With reference to FIG. 1, a system 100 for selecting resources for automatic modeling using forecast thresholds is illustrated in accordance with a non-limiting embodiment of the present disclosure. System 100 includes computer 40, database 70, hosting environment 10, and client 80, which are all connected via network 60. Computer 40 includes memory 42, processor 50, I/O 54, interface 52, and hard disk 56. Processor 50 loads instructions from hard disk 56 and executes them in memory 42. For example, processor 50 executes a forecasting and modeling process 44 in memory 42. Forecasting and modeling process 44 receives system monitoring data for a hosting environment 10 including servers 70*a-n* and virtual resources 30*a-n*. The system monitoring data includes linear utilization data. Forecasting and modeling process 44 converts this linear component utilization data into non-linear real capacity and consumption and/or headroom data for accurate forecasting and modeling of resource capacities.

In certain embodiments, forecasting and modeling process 44 receives a baseline time period for generating a baseline data set of real capacity and consumption data for a set of resources. The forecasting and modeling process 44 may also receive forecast thresholds. Additionally or alternatively, default values may be set for each of these values in the event that no settings are received. Forecasting and modeling process 44 may also receive a subset of servers, an application, a service, or a group of virtual resources to monitor. For example, a user may specify that the process should monitor resources associated with a particular application. As another example, a user may specify particular physical resources to monitor analyzing and scheduling for modeling operations. Forecasting and modeling process 44 collects real capacity and consumption data for those specified resources. For example, database 70 may store capacity and consumption data for hosting environment 10 resources, such as virtual resources 30*a-n*, virtual memory 32*a-n*, virtual processors 34*a-n*, other virtual components 36*a-n*, and physical servers 70*a-n*, from a system monitoring application. Forecasting and modeling process 44 may retrieve data from a system monitoring process or application in suitable fashion.

In certain embodiments, forecasting and modeling process 44 applies a linear regression analysis on the baseline dataset retrieved for each resource in hosting environment 10. The results of the linear regression analysis may produce a trend line which can be projected into the future to determine usage, utilization, or headroom trends.

The received threshold ranges may be plotted against the trend lines from the linear regression analysis to determine resources that may exceed or fall below the predetermined threshold ranges. The system may determine the amount of hours, weeks, or months until that resource is expected to hit that threshold. Such a calculation may be described as a "time-to-threshold" calculation.

Based on the time-to-threshold calculation, the system may configure and schedule particular resources for modeling. The system may additionally create various scenarios that describe different workload placement options, configuration options, virtual resource placement options, and consolidation options. Additionally or alternatively, the system may allow the user to create new scenarios for modeling based on the identified resources.

For example, if the system determines that virtual processor 34*b* is over utilized and that real capacity utilization for that particular component will exceed 80% in the next week, the system may mark that resource for modeling and configure modeling scenarios that include expansion of physical server infrastructure 70*a-n* or inclusion of virtual resource 30*a* to help service the applications of virtual processor 34*b*. As another example, if virtual memory 32*a* is determined to be under-utilized (e.g., that virtual memory 32*a* capacity utilization will fall below 20% in the next 2 months), the system may generate additional scenarios for consolidation of virtual resource 30*a* with, for example, virtual resource 30*b*. Thus, identification of critical components using forecast thresholds may enable analysis of additional components using scenario model configured to alleviate deviations in utilization and headroom trend lines from threshold ranges.

In certain embodiments, the historical baseline datasets may also be used to identify outlying data points. For example, utilization may fall below a certain threshold every weekend or every holiday. Thus, the user may specify a range of data points to use in the trend line linear regression analysis. For example, the user may specify that the median 90% of data points should be used in the linear regression analysis. Thus, outlying data points may be eliminated from consideration since they may tend to skew trend line results.

In certain embodiments, the system may automatically analyze results of the modeling and implement a particular configuration scenario or plan. For example, several scenarios may be modeled, including a reconfiguration of a resource, addition or subtraction of virtual components, work-load placement changes, and application or service re-assignment. The system may determine which scenario successfully extends the time-to-threshold analysis the longest. That is to say the system may recalculate a linear regression analysis of the modeled capacity utilization data and determine which scenario is most successful at preventing the deviation from the predetermined threshold ranges. The system may select such as scenario and implement the scenario in the current environment. This may be done automatically, without user interaction, or manually, by prompting a user for approval.

Figure 2:
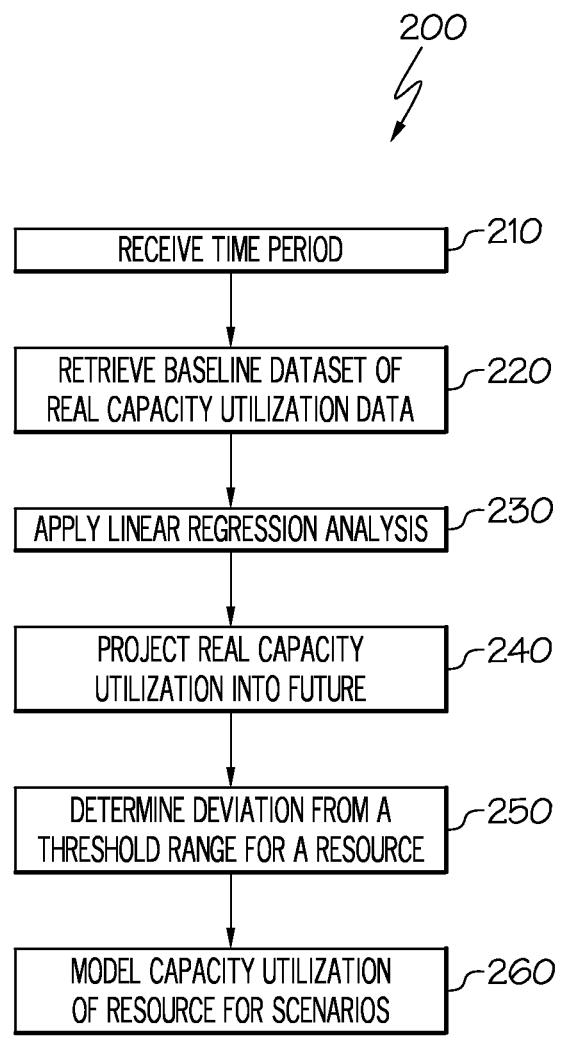
FIG. 2 illustrates a flow chart of a method for selecting resources for automatic modeling using forecast thresholds in accordance with a non-limiting embodiment of the present disclosure.

With reference to FIG. 2, a method 200 for selecting resources for automatic modeling using forecast thresholds is illustrated in accordance with a non-limiting embodiment of the present disclosure. At step 210, a time period is received. The time period may be used to retrieve a baseline data set of real capacity utilization data in step 220. For example, an application monitoring system may poll various resources and track resource consumption, capacity, and headroom. These systems may be used by IT administrators in monitoring and servicing application performance status. These systems may collect multiple dimensions of data for each resource. For example, the system may collect capacity utilization data for CPU, memory, and network utilization for a particular resource.

At step 230, a linear regression analysis is applied to each retrieved baseline dataset to determine a trend line. The data may be normalized to exclude certain values before the linear regression analysis is applied. For example, the data may be filtered to include on the median 90% of the data points of the data set.

At step 240, the trend line is projected into the future to forecast real capacity utilization. At step 250, the forecasted trend lines may be compared to a predetermined threshold range to determine a deviation from the threshold range in the trend data. Resources that are forecasted to deviate from the threshold ranges may be marked for modeling.

At step 260, capacity utilization of the resource is modeled for various scenarios. The scenarios that are modeled may vary based on the deviation. For example, if one resource is projected to have real capacity utilization below 20%, the system may generate scenarios for modeling consolidation operations.

The teachings of the present disclosure may utilize a non-linear scalability model, which may also be used in the capacity modeling space, to determine real capacity consumption and headroom data. For example, a portable, vendor-independent performance score may be a collection of platform independent calculations of that characterize the capacity of a system to provide resources to users of the system and characterize the consumption of those resources. A portable, vendor-independent performance score may be referred to as a resource score. In certain configurations, CPU resource score is a computed value of the capacity of a target system to deliver CPU computing power to applications, taking into account unique scalability characteristics of the host hardware, operating system, and virtualization environment. A resource score may include scores for other components within a system, such as memory, network, and storage I/O. Thus, reporting of aggregate computing capacity across individual—or groups of—hosts, virtual machines, or datacenters may be reported, managed, and modeled, thus advancing the overall understanding of performance management in enterprise IT infrastructures.

A more detailed description of portable, vendor-independent performance scores and modeling is contained in U.S. Patent Application Publication No. 2014/0019964 A1 and is incorporated herein by reference.

The various portable, vendor-independent performance scores, performance metrics, real utilization measurements, real capacity measurements, and the like, that are described in various embodiments of the present disclosure may be portable. In other words, resource scores may allow comparisons between heterogeneous hardware and software systems. For example, resource scores may permit a true comparison between true capacity of a legacy, aging system and a more modern system. This comparison may be made without regard to software components running on the systems.

Portable, vendor-independent performance scores may be used to model and/or predict performance of proposed system configurations. Such modeling may allow IT managers to more effectively plan hardware and software provisioning and procurement strategies to maximize desired performance metrics associated with those systems.

Portable, vendor-independent performance scores can be determined based on a corresponding component model for each particular hardware/software configuration. For example, component models may be generated for a set of hardware architectures, operating systems, and/or virtualization platforms. The component models may be associated with corresponding non-linear real capacity/consumption performance scalability models that evaluate, predict, and/or model system performance for a particular architecture. In certain embodiments, these models are predefined. In certain embodiments, these models may be generated by benchmarking, analyzing, and evaluating component performance until a realistic non-linear component performance model can be generated that realistically models performance of the component.

Component models may be grouped into a subset of models, e.g., a component model library. Various combinations of component models are selected to match a particular system configuration. In certain embodiments, this selection is automated. For example, a system may discover the various hardware and software components that make up a certain system configuration. In a data center, the system may discover each distinct hardware component architecture, including type of processors, number of processors, threads, cores, hyper-threading capabilities, memory capacity, busses, terminals, cache and other on-chip memory capacity, and the like.

The system may select a component model from the component model library that matches the discovered hardware architecture. In data center or other grouping of heterogeneous hardware components, each hardware component may have a corresponding model in the component model library. Similarly, the system may further discover various operating system and other software application components. For example, the system may discover a WINDOWS SERVER 2008™ operating system running on a particular hardware component. A corresponding component model library component model may be selected to match the hardware and operating system of the matching component. The system may additionally discover any virtualization software running on one or more particular servers. The system may additionally determine virtual system configurations, such as virtual provisioned system resources, operating systems, and the like. A corresponding component model may be selected for the virtualization platform, while also accounting for the underlying physical hardware and operating system architectures in any generated resource scores.

In addition to component models, a particular benchmark may be used to calculate a portable, platform and vendor independent resource score. In certain embodiments, the STANDARD PERFORMANCE EVALUATION CORPORATION™ ("SPEC") benchmark may be used. In certain configurations other benchmarking standards may be used.

In certain embodiments, the component library models may fill in missing pieces of the performance scores/estimations generated by a benchmark. For example, a benchmark may test system performance when the system is running at maximum load. Thus, component models may model performance of the component when system load is at various stages below maximum load capacity. Thus, the component benchmarking score may be just one piece in the overall determination of a portable, vendor-independent performance score.

A portable, vendor-independent performance score may be used to express one or more of capacity of a system to execute new work, jobs, loads, applications, and/or requests, and consumption of entities running on that system. Capacity may be determined using basic benchmarking performance information, the specific configuration information of a particular system, a component model of hardware scalability for the particular configuration and operating system and/or virtualization technology scalability model.

The portable, vendor-independent performance score may be used to model capacity utilization for a particular resource configuration. In certain embodiments, resource configurations may be specified in scenarios. Models may be generated for each scenario. A performance score describes real capacity and consumption metrics for each scenario.

Figure 3:
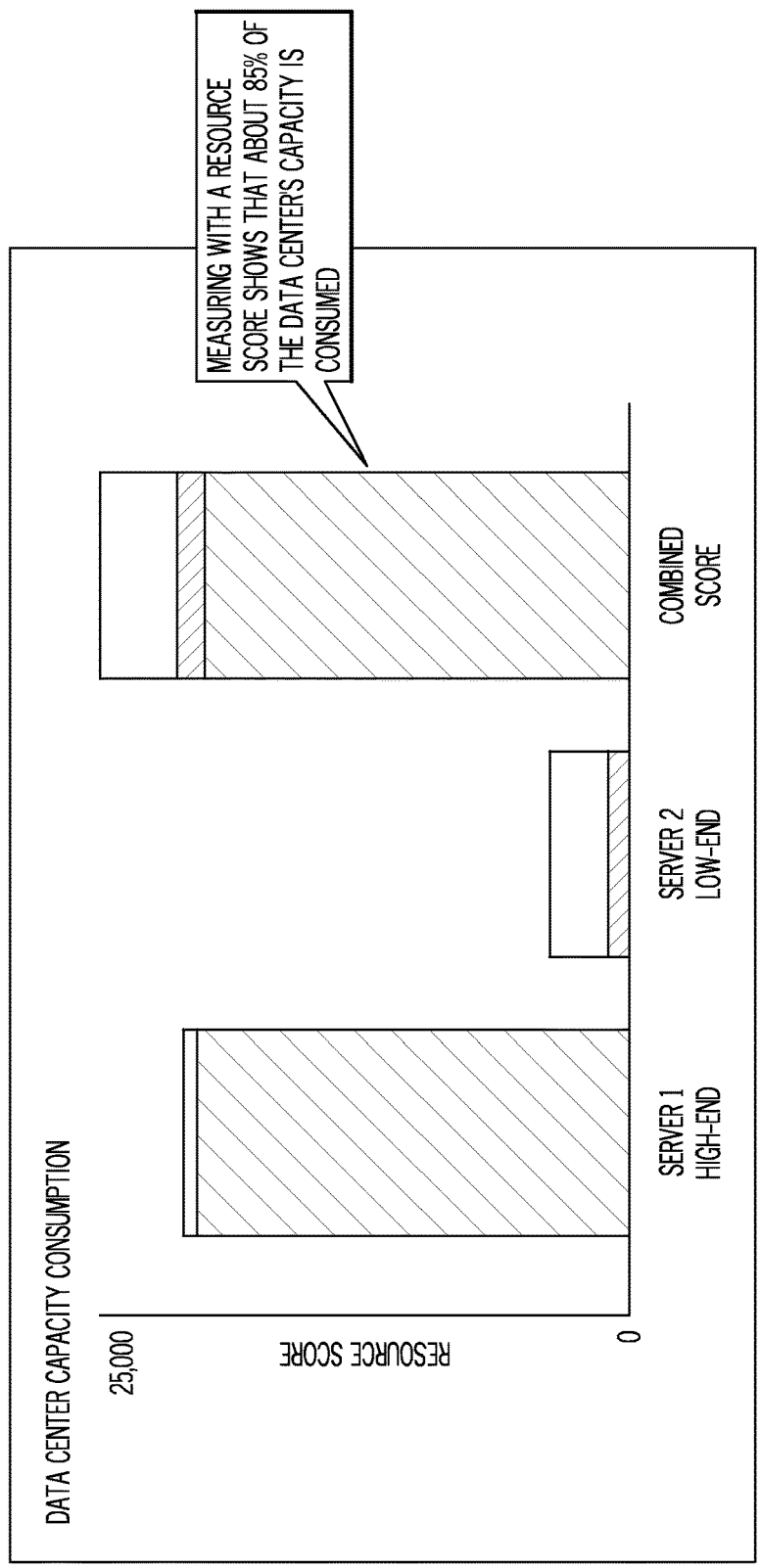
FIG. 3 illustrates an example of real capacity consumption among resources and a combined data center capacity consumption in accordance with a non-limiting embodiment of the present disclosure.

With reference to FIG. 3 as an example, real capacity consumption among heterogeneous resources is illustrated in accordance with a non-limiting embodiment of the present disclosure. Specifically, FIG. 3 shows a high-end server 1, a low-end server 2, and a combined capacity consumption resource score for the data center that comprises servers 1 and 2. Server 1 capacity consumption is near full capacity, while server 2 capacity consumption is at roughly 25% of capacity. Traditionally, categorization or scoring of actual or real capacity metrics was impossible. For example, each vendor would provide a linear output of resource consumption based solely on the amount of activity for the resource. However, due to the complex nature of integrated system components, these outputs are inaccurate. For example, a CPU at 90% utilization cannot actually accommodate 10% more operations. Rather, inherent limitations in the system architecture may prevent a CPU at 90% utilization from executing any additional instructions. Thus, real capacity consumption and utilization resource scores may more accurately gauge resource headroom.

Further, such resources scores may provide a portable, vendor-independent headroom calculation. Thus, as referenced in FIG. 3 servers 1 and 2 may be combined to provide a combined score and available headroom of the data center.

Figure 4:
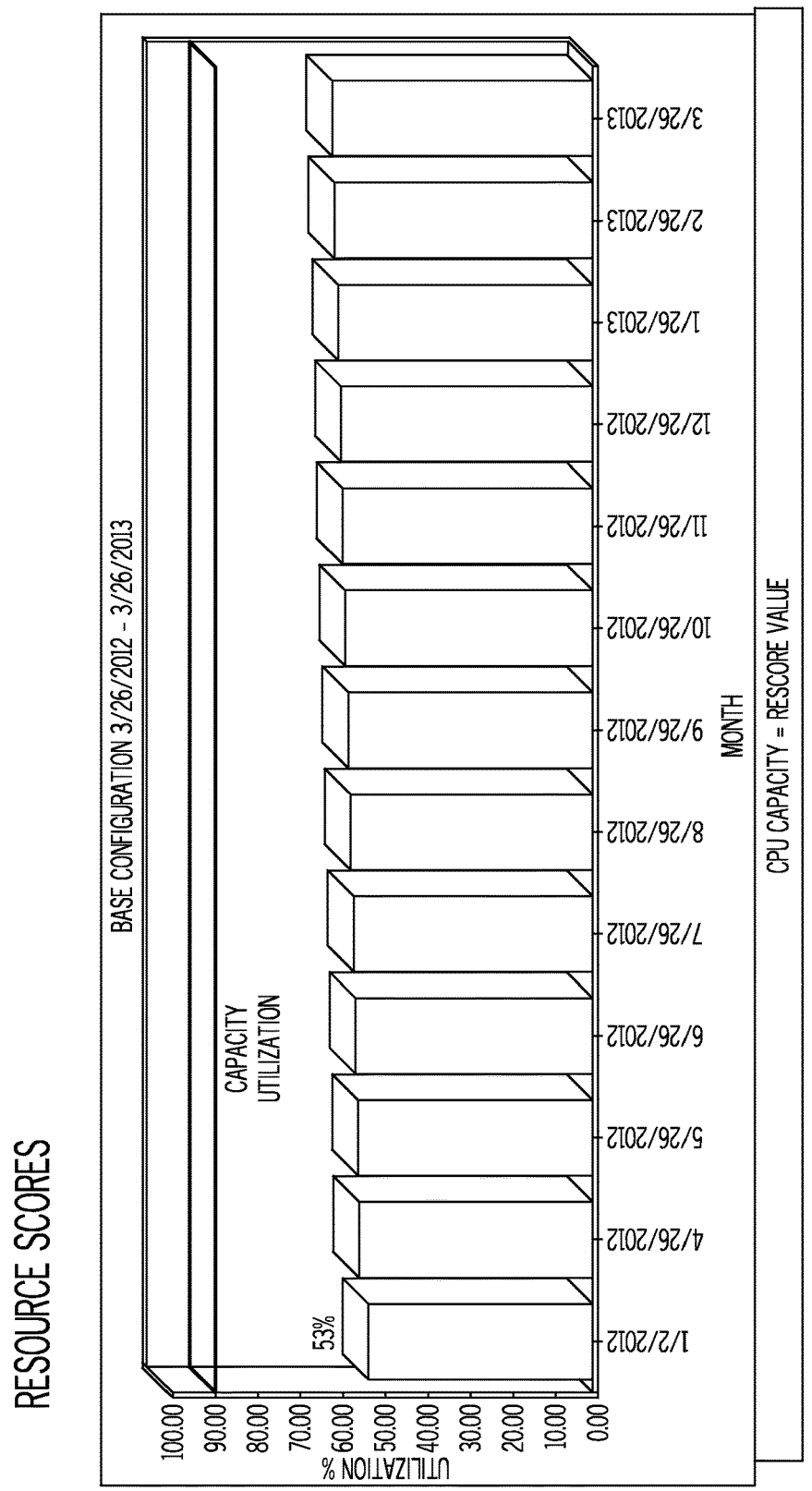
FIG. 4 illustrates CPU capacity utilization for a particular resource configuration over several months in accordance with a non-limiting embodiment of the present disclosure.

With reference to FIG. 4, CPU capacity utilization for a particular resource configuration over several months is illustrated in accordance with a non-limiting embodiment of the present disclosure. Such a figure may be displayed in a user interface in the systems described in the present disclosure. For example, resources selected for capacity consumption modeling may be analyzed for various scenarios that include various workload placement and configuration parameters. The results of a particular scenario may be summarized in a chart, such as the chart of FIG. 4.

FIG. 4 additionally or alternatively may illustrate the capacity utilization data projections described in the systems of the present disclosure. For example, a user may select a baseline dataset, such as the months of January 2012 and April 2012. The system may apply a linear regression analysis on this dataset and project the data using a non-linear scalability model. For example, the data may be projected through March 2013.

With reference to FIG. 5, the differences between traditional linear CPU projection analysis and capacity utilization modeling projections are illustrated in accordance with a particular non-limiting embodiment of the present disclosure. The capacity modeling projections may be based on a customized model for the particular resource being modeled. Thus, the capacity modeling projection may be a more accurate gauge of projected capacity utilization and headroom.

Figure 6:
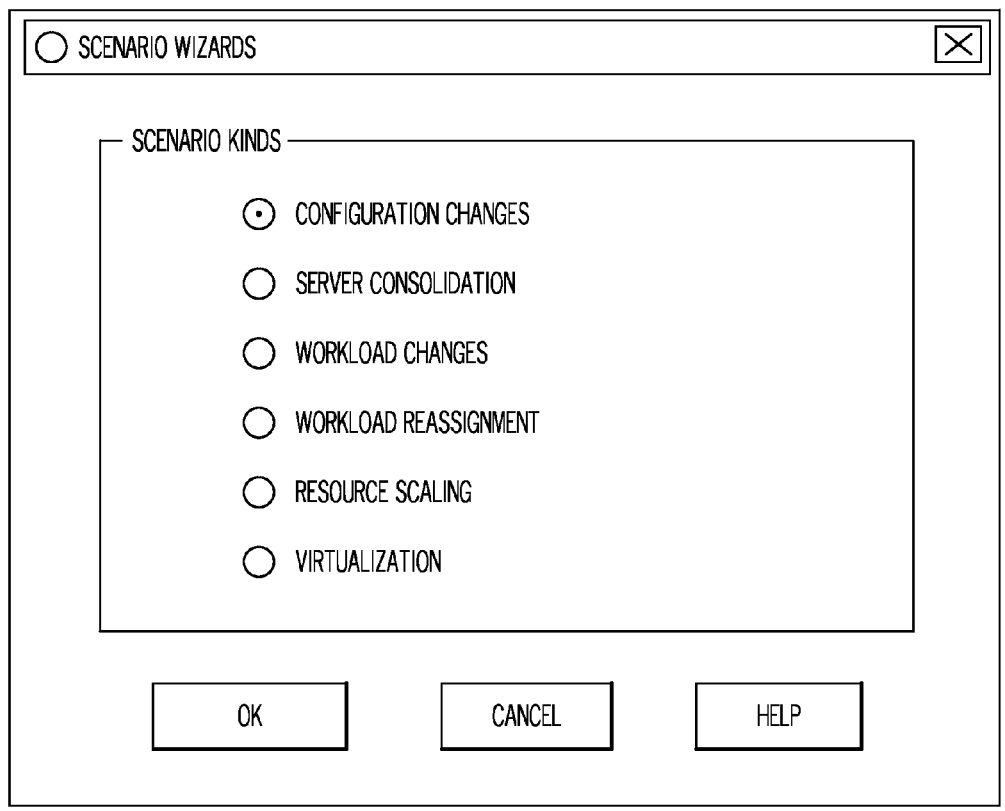
FIG. 6 illustrates an example user interface for selecting various categories of modeling scenarios in accordance with a non-limiting embodiment of the present disclosure.

With reference to FIG. 6, an example user interface for selecting various categories of modeling scenarios is illustrated in accordance with a non-limiting embodiment of the present disclosure. For example, a user may be presented with such a user interface during an initialization step. The user may select the type of scenario to add to a set of scenarios. This particular user interface shows the user has selected configuration changes as the scenario or group of scenarios to model. Thus, the system may determine critical resources using forecast thresholds and may model various scenarios dealing with configuration changes for those critical resources. Other options may include server consolidation, workload changes, workload reassignment, resource scaling, virtualization changes, and the like. Scenarios may be based on any other type of configuration change related to modeling data center resources, networking, computing components, applications, or the like.

Figure 7:
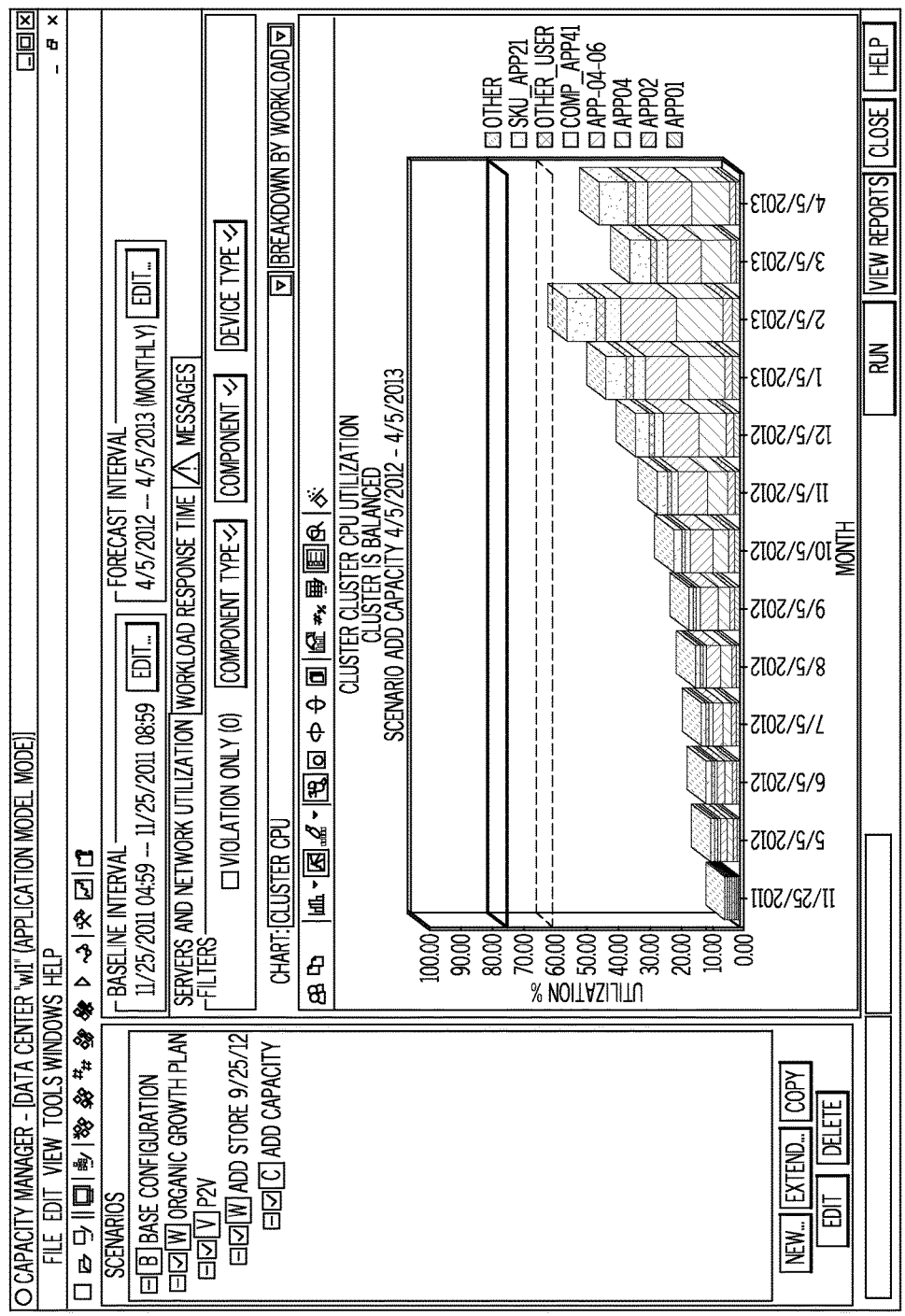
FIG. 7 illustrates an example user interface for executing and displaying scenario models in accordance with a non-limiting embodiment of the present disclosure.

With reference to FIG. 7, an example user interface for executing and displaying scenario models is illustrated in accordance with a non-limiting embodiment of the present disclosure. Such a user interface may be used to configure, schedule, and analyze results of capacity and consumption modeling operations and or virtual machine placement or sizing management operations. For example, several scenarios may be modeled in the scenarios pane of the user interface, while capacity utilization modeling data including resource score information may be presented in the chart pane. Filters and baseline intervals may additionally be set in each respective user interface pane. For example, a user may select the baseline interval set from which to select a baseline data set of capacity consumption data. The forecast interval may additionally be set. Filters for various forecast thresholds may be set. For example, a forecast threshold regarding servers and network utilization may be set. Additional filters may relate to workload response time. Various other user interface panels may be present in various embodiments of the present disclosure.

Figure 8:
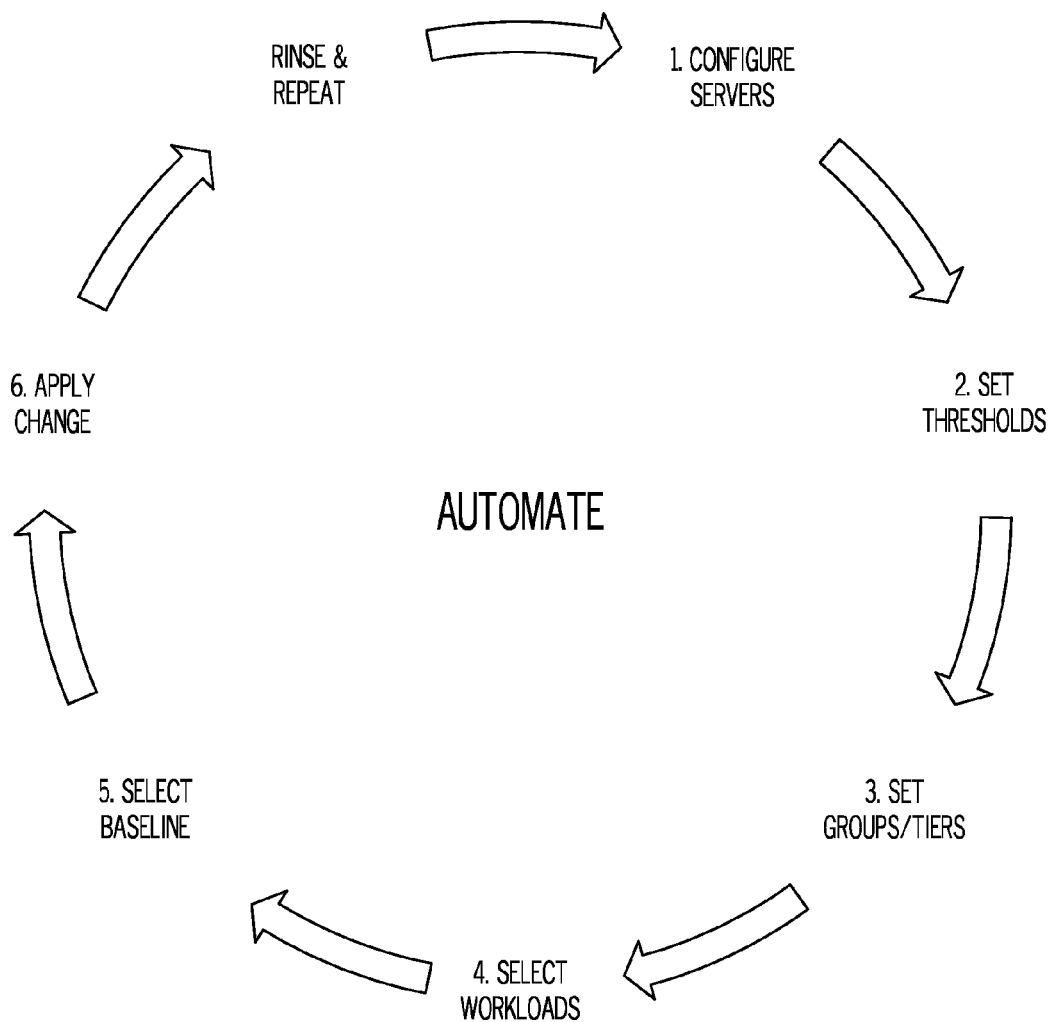
FIG. 8 illustrates a flow chart of steps in capacity planning in a system for selecting resources for automatic modeling using forecast thresholds in accordance with a non-limiting embodiment of the present disclosure.

With reference to FIG. 8, a flow chart of steps used in capacity planning operations for a particular embodiment of the present disclosure is illustrated. Generally, scenarios are configured, thresholds are set, and tiers of resources are set. Workloads are placed and or modified according to a growth rate. Baseline data is selected. For example, a historical time period is selected for retrieving a baseline data set. Scenario changes are applied for each model and the process is repeated. The teachings of the present disclosure may automate these steps to aid administrators in infrastructure management, capacity planning, virtual resource management, and workload placement operations.

With reference to FIG. 9, an example user interface for displaying results of a forecast threshold analysis is illustrated in accordance with a non-limiting embodiment of the present disclosure. The user interface of FIG. 9 shows the number of resources trending towards or deviating from a threshold organized by service sector. The user interface additionally allows users to model scenarios targeted specifically for the service sector. For example, service profile, service optimization, and/or service forecast may be clicked to initiate modeling operations for the critical resources associated with each service.

Figure 10A:
FIG. 10A illustrates an example user interface for displaying service optimization recommendations in a system for selecting resources for automatic modeling using forecast thresholds in accordance with a non-limiting embodiment of the present disclosure.

With reference to FIG. 10A, a user interface for displaying service optimization recommendations is illustrated in accordance with another embodiment of the present disclosure. FIG. 10B illustrates virtual resource sizing reports for particular resources. Such a user interface may show a recommended resize operation for each resource based on trended capacity utilization and consumption or headroom data.

Figure 11:
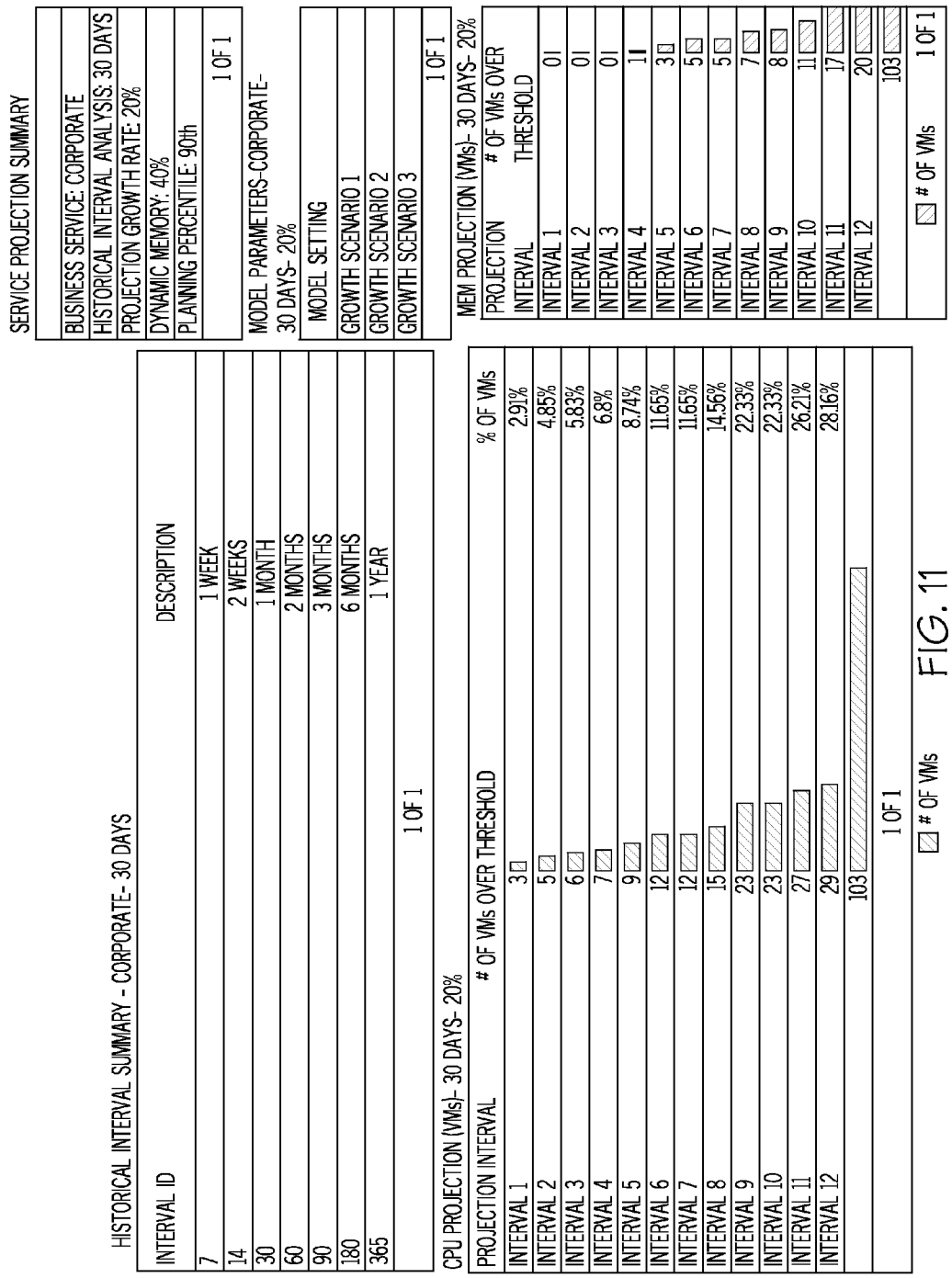
FIG. 11 illustrates an example user interface for a service projection summary that includes historical interval analysis, projection growth rates, and service forecast summary details in accordance with a non-limiting embodiment of the present disclosure.

FIGS. 11 and 12A-D illustrate various user interface reports that may be generated by the capacity consumption and utilization modeling systems of the present disclosure. FIG. 11 shows projection analysis results over a series of projection intervals. For example, a user may select a historical interval for collecting baseline capacity consumption and utilization data for a particular resource as well as forecast intervals for applying forecast thresholds to projected data. The user interface report of FIG. 11 shows a total count of resources determined to deviate from the forecast threshold at each interval.

FIGS. 12A-D each illustrates various projection reports for various resource types. The reports illustrate the current state of the resource, the interval during which the resource breached the forecast threshold, and a listing of utilization levels at each forecast interval.

Certain legacy systems may not assist user selection of servers for virtual placement management operations, such as virtual resource consolidation, or capacity management modeling processes. Additionally, users have only a discrete amount of servers that they can select from to simulate and/or model capacity planning and consolidation scenarios due to the high cost of manual configuration of modeling operations.

In certain embodiments certain time consuming tasks that may have only been performed by manual configuration processes in the past are now automated by the teachings of the present disclosure. For example, embodiments of the present disclosure perform a linear regression analysis on a large set of servers, such as an entire data center of group of data centers. This global set of servers can be specified by the user or the analysis can consider all servers of a particular kind in systems management database. For example, all physical servers can be specified for forecasting threshold analysis to determine critical servers for modeling operations.

As another example, the user may specify the relative baseline. A default baseline of three or six months may be automatically chosen if the user does not specify the baseline As another example, the user may specify how far into the future the data should be trended.

As another example, the user may specify the threshold for the trended utilization or use a default. The user may configure a 70% maximum threshold for a three-month projection period. Thus, resources whose trended capacity consumption and headroom utilization exceeds 70% within three months of the projection period may be modeled. Additionally or alternatively, users can specify if the CPU utilization does not go beyond 25% in three months, it will be a candidate for consolidation via virtual placement management or capacity modeling analysis. However, if no thresholds are specified, the system may select default threshold levels.

As another example, regressions may be run on multiple dimensions of the baseline dataset. For example, the baseline capacity consumption and headroom dataset may include data for various components, including CPU, memory, network, and the like. The analysis described in the present disclosure may be conducted with respect to multiple component datasets within the baseline dataset.

Servers can be automatically selected for consolidation and fed to various modeling processes, such as virtual placement management software and/or capacity modeling software processes.

Automatic resize operations may be conducted based on the generated models. The resize operations may compare the generated models to threshold rules and trend/slope data. For example, if a generated model shows CPU capacity above a predetermined threshold, regression analysis may be applied to the model to determine the slope of the capacity curve. If current CPU capacity consumption is trending up, then additional system resources may be provisioned according to the sizing templates. However, if CPU capacity consumption is trending down, no new sizing operations may be triggered.

The teachings of the present disclosure may overcome some or all of the challenges in configuring capacity models by automating one or more of the above described processes and providing sizing recommendations based on certain predetermined rules and parameters.

In certain embodiments, performance metric data points for a large scale IT infrastructure, such as a cloud environment, are compiled in a view. The view may be a materialized view created nightly. Traditionally, system administrators may manually manage performance using these generated views. The teachings of the present disclosure may utilize this performance data and CML components corresponding to resources in an IT environment to generate capacity consumption models. These capacity consumption models may be based on historical data trends, but may be an excellent predictor of future capacity requirements. For example, using the above described example, capacity thresholds may be used along with slope detection capabilities to determine sizing recommendations for particular components in an IT environment.

In certain embodiments, sizing rules for virtual environments may be set using templates. For example, one organization may specify that only virtual machines having certain configurations (e.g., two processors with four GB of memory) are to be provisioned/used in the virtual environment. Virtual machine templates may specify these parameters as sizing guidelines. Thus, sizing recommendations may be made according to the virtual machine templates. For example, a virtual machine that requires more processing power may be re-sized to a virtual machine having the next highest processing capacity based on a virtual machine template specification.

In one example, virtual machine templates may be specified based on the operating system of the virtual machine. In this example, MICROSOFT WINDOWS™ templates include the following configurations: one processor with four GB of memory, one processor with eight GB of memory, two processors with four GB of memory, and two processors with eight GB of memory. LINUX™ templates include the following configurations: two processors with four GB of memory, two processors with six GB of memory, two processors with eight GB of memory, and eight processors with twelve GB of memory.

Accordingly, when an automatic resize operation of a virtual machine is performed, the system may account for virtual resource operating system and available sizing templates for sizing operations.

Additionally, cluster and/or pool level resources may be accounted for in the above analysis. For example, if the system recommends increasing provisioned CPU's when a resource pool is oversubscribed, then not enough resources may be available in the resource pool. Thus, available resources and demand for those resources in resource pools may be examined and reported to a user. In certain embodiments, resizing operations may still occur with an oversubscribed resource pool. However, the system administrator may be notified of the shortage in the resource pool so that appropriate action may be taken.

In one example, the system may generate weekly trend reports that notify stakeholders of usage trends in virtual environments. Exception reports may also be generated that specify which systems are outliers in terms of usage and/or performance. Allocation reports may detail how resources are being or should be allocated. Aggregate detail reports may contain details on multiple metrics and underlying resources. For example, metrics for a specific set of virtual machines and/or associated clusters may be determined and displayed in a report.

The teachings of the present disclosure may enable generation of a sizing report. The sizing report may contain performance data regarding virtual resources in a virtualization environment, and may be automatically generated nightly, without user configuration.

Users may assign sizing rules for a given parameter. In certain embodiments, default or automatic sizing rules may be in place. The sizing rules may automatically right-size (e.g., up or down) virtual resources based on the next highest template resource if the slope of the metric that is the subject of the sizing rule indicates a trend in line with a provisioning strategy. For example, if CPU capacity consumption is declining and falls below a sizing rule threshold, the system may determine the slope and/or trend of the CPU consumption and my right-size the virtual resource down to the next CPU configuration down.

Users may modify sizing rule parameters as needed with a user interface. Thus, when the values in the sizing report increase above a certain level specified by either default or user-specified sizing rules, virtual resources may be automatically right-sized to respond accordingly.

Configuration of modern capacity modeling processes may be divided into certain sections. For example, one capacity modeling process may be divided into three distinct sections that may each have separate sub-sections and/or tasks associated with them. Each of these sections/tasks may be manual and may be required to model system capacity. Further, a user may be required to manually select which virtual machine/servers, out of numerous components across an enterprise virtualization environment, are to be included as part of the capacity modeling operation.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
   retrieving capacity utilization data for a plurality of resources;
   applying a linear regression analysis on the capacity utilization data;
   projecting, using a processor, the capacity utilization data through a future time based on results of the linear regression analysis;
   determining a deviation from a predetermined threshold range in the projected capacity utilization data for a first resource on a host, wherein the first resource is a virtual processor;
   in response to determining the deviation, automatically selecting a plurality of alternative resource configurations for the plurality of resources based on predefined resource templates that specify resource options available for the alternative resource configurations, wherein each of the alternative resource configurations is selected based on whether it allocates additional resources to the first resource;
   in further response to determining the deviation, automatically determining, for each of the plurality of alternative resource configurations, future capacity utilization of the first resource based on a non-linear capacity consumption model corresponding to the resource configuration, wherein the non-linear capacity consumption model comprises a plurality of resource scores that each characterize a capacity of each resource in the resource configuration to service additional workloads in view of scalability characteristics of a virtual memory and virtual storage I/O on the host in the non-linear capacity consumption model, and wherein the future capacity utilization of the first resource is dependent upon the scalability characteristics of the host virtual memory and virtual storage I/O; and
   applying a selected resource configuration from the plurality of alternative resource configurations to the first resource to prevent the first resource from deviating from the predetermined threshold range.

2. The method of claim 1, wherein the first resource is a virtual resource associated with a particular service, and wherein at least one of the plurality of alternative resource configurations comprises configuration information regarding other virtual resources associated with the particular service.

3. The method of claim 1, further comprising:
   receiving a growth rate associated with a workload of the first resource, and wherein determining the future capacity utilization of the first resource further comprises modifying the workload of the first resource by the growth rate.

4. The method of claim 1, wherein the first resource is a server, and wherein the selected resource configuration comprises a virtual resource placement map for the server.

5. The method of claim 1, wherein the selected resource configuration comprises a consolidation of physical servers associated with the plurality of resources.

6. The method of claim 1, further comprising:
   applying a set of related configuration changes to the plurality of resources based on the selected resource configuration.

7. The method of claim 1, wherein projecting the capacity utilization data comprises projecting CPU capacity utilization and memory capacity utilization for each of the plurality of resources.

8. A computer configured to access a storage device, the computer comprising:
   a processor; and
   a non-transitory, computer-readable storage medium storing computer-readable instructions that when executed by the processor cause the computer to perform:

retrieving capacity utilization data for a plurality of resources;

applying a linear regression analysis on the capacity utilization data;

projecting, using a processor, the capacity utilization data through a future time based on results of the linear regression analysis;

determining a deviation from a predetermined threshold range in the projected capacity utilization data for a first resource on a host, wherein the first resource is a virtual processor;

in response to determining the deviation, automatically selecting a plurality of alternative resource configurations for the plurality of resources based on predefined resource templates that specify resource options available for the alternative resource configurations, wherein each of the alternative resource configurations is selected based on whether it allocates additional resources to the first resource;

in further response to determining the deviation, automatically determining, for each of the plurality of alternative resource configurations, future capacity utilization of the first resource based on a non-linear capacity consumption model corresponding to the resource configuration, wherein the non-linear capacity consumption model comprises a plurality of resource scores that each characterize a capacity of each resource in the resource configuration to service additional workloads in view of scalability characteristics of a virtual memory and virtual storage I/O on the host in the non-linear capacity consumption model, and wherein the future capacity utilization of the first resource is dependent upon the scalability characteristics of the host virtual memory and virtual storage I/O; and applying a selected resource configuration from the plurality of alternative resource configurations to the first resource to prevent the first resource from deviating from the predetermined threshold range.

9. The computer of claim 8, wherein the first resource is a virtual resource associated with a particular service, and wherein at least one of the plurality of alternative resource configurations comprises configuration information regarding other virtual resources associated with the particular service.

10. The computer of claim 8, wherein the computer-readable instructions further cause the computer to perform:

receiving a growth rate associated with a workload of the first resource, and wherein determining the future capacity utilization of the first resource further comprises modifying the workload of the first resource by the growth rate.

11. The computer of claim 8, wherein the first resource is a server, and wherein the selected resource configuration comprises a virtual resource placement map for the server.

12. The computer of claim 8, wherein the selected resource configuration comprises a consolidation of physical servers associated with the plurality of resources.

13. The computer of claim 8, wherein the computer-readable instructions further cause the computer to perform:

applying a set of related configuration changes to the plurality of resources based on the selected resource configuration.

14. The computer of claim 8, wherein projecting the capacity utilization data comprises projecting CPU capacity utilization and memory capacity utilization for each of the plurality of resources.

15. A computer program product comprising:

a non-transitory computer-readable storage medium having computer-readable program code embodied therewith, the computer-readable program code comprising:

computer-readable program code configured to retrieve capacity utilization data for a plurality of resources;

computer-readable program code configured to apply a linear regression analysis on the capacity utilization data;

computer-readable program code configured to project, using a processor, the capacity utilization data through a future time based on results of the linear regression analysis;

computer-readable program code configured to determine a deviation from a predetermined threshold range in the projected capacity utilization data for a first resource on a host, wherein the first resource is a virtual processor;

computer-readable program code configured to, in response to determining the deviation, automatically select a plurality of alternative resource configurations for the plurality of resources based on predefined resource templates that specify resource options available for the alternative resource configurations, wherein each of the alternative resource configurations is selected based on whether it allocates additional resources to the first resource;

computer-readable program code configured to, in further response to determining the deviation, automatically determine, for each of the plurality of alternative resource configurations, future capacity utilization of the first resource based on a non-linear capacity consumption model corresponding to the resource configuration, wherein the non-linear capacity consumption model comprises a plurality of resource scores that each characterize a capacity of each resource in the resource configuration to service additional workloads in view of scalability characteristics of a virtual memory and virtual storage I/O on the host in the non-linear capacity consumption model, and wherein the future capacity utilization of the first resource is dependent upon the scalability characteristics of the host virtual memory and virtual storage I/O; and computer-readable program code configured to apply a selected resource configuration from the plurality of alternative resource configurations to the first resource to prevent the first resource from deviating from the predetermined threshold range.

16. The computer program product of claim 15, wherein the first resource is a virtual resource associated with a particular service, and wherein at least one of the plurality of alternative resource configurations comprises configuration information regarding other virtual resources associated with the particular service.

17. The computer program product of claim 15, wherein the computer-readable program code further comprises:

computer-readable program code configured to receive a growth rate associated with a workload of the first resource, and wherein determining the future capacity utilization of the first resource further comprises modifying the workload of the first resource by the growth rate.

18. The computer program product of claim 15, wherein the first resource is a server, and wherein the selected resource configuration comprises a virtual resource placement map for the server.

19. The computer program product of claim 15, wherein the selected resource configuration comprises a consolidation of physical servers associated with the plurality of resources.

20. The computer program product of claim 15, wherein the computer-readable program code further comprises:
  computer-readable program code configured to apply a set of related configuration changes to the plurality of resources based on the selected resource configuration.

* * * * *